Feb. 6, 1962 G. V. JACOBY 3,020,476
MEASURING APPARATUS

Filed May 26, 1958 3 Sheets-Sheet 1

INVENTOR.
GEORGE V. JACOBY

BY *Arthur H. Swidman*

ATTORNEY.

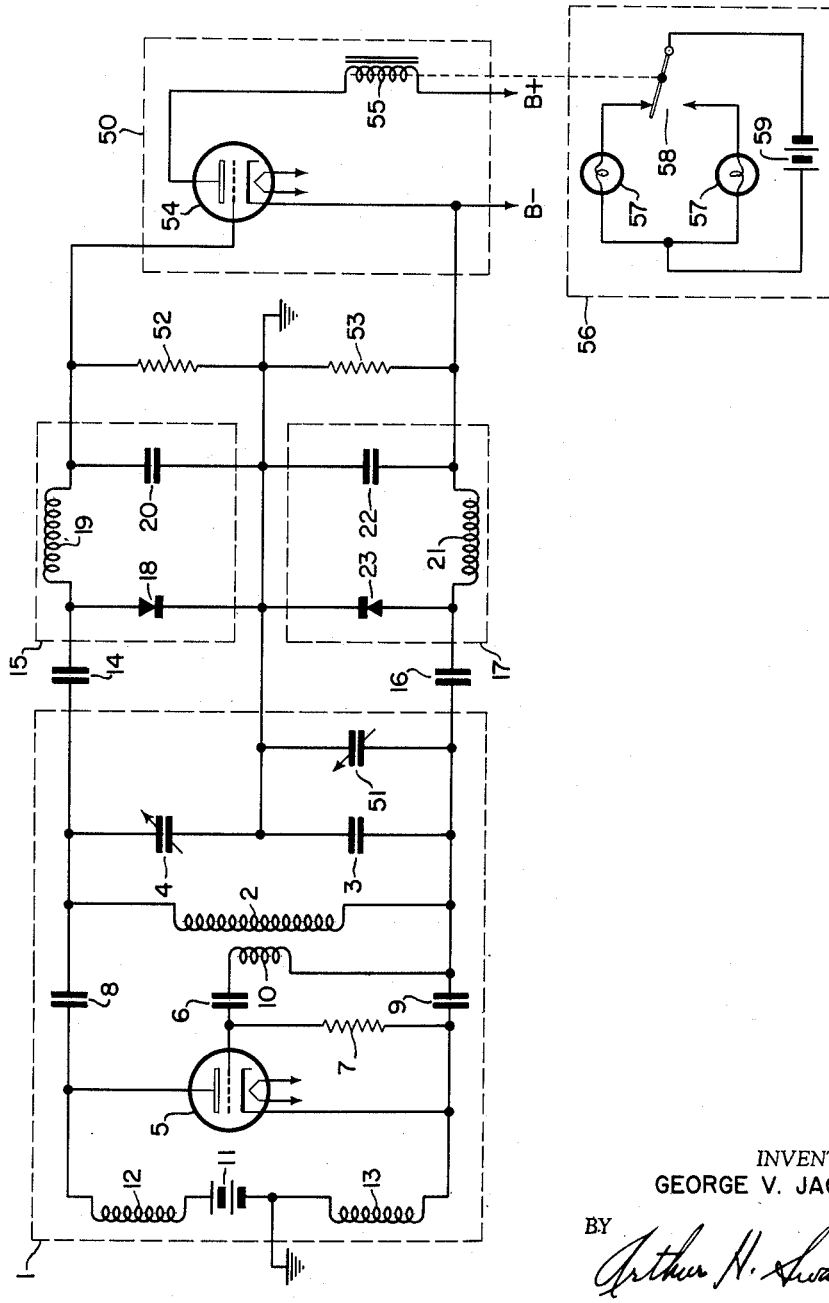

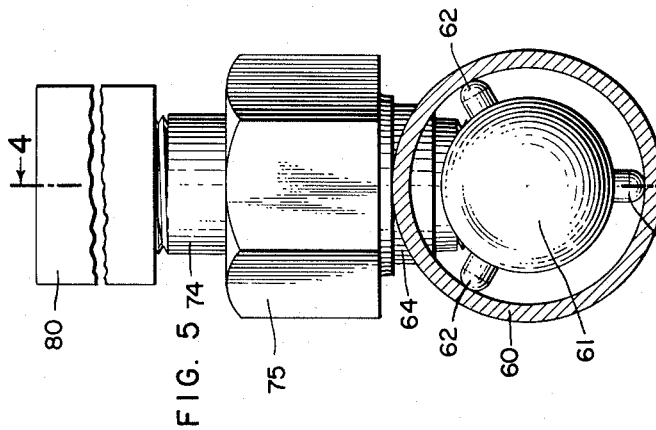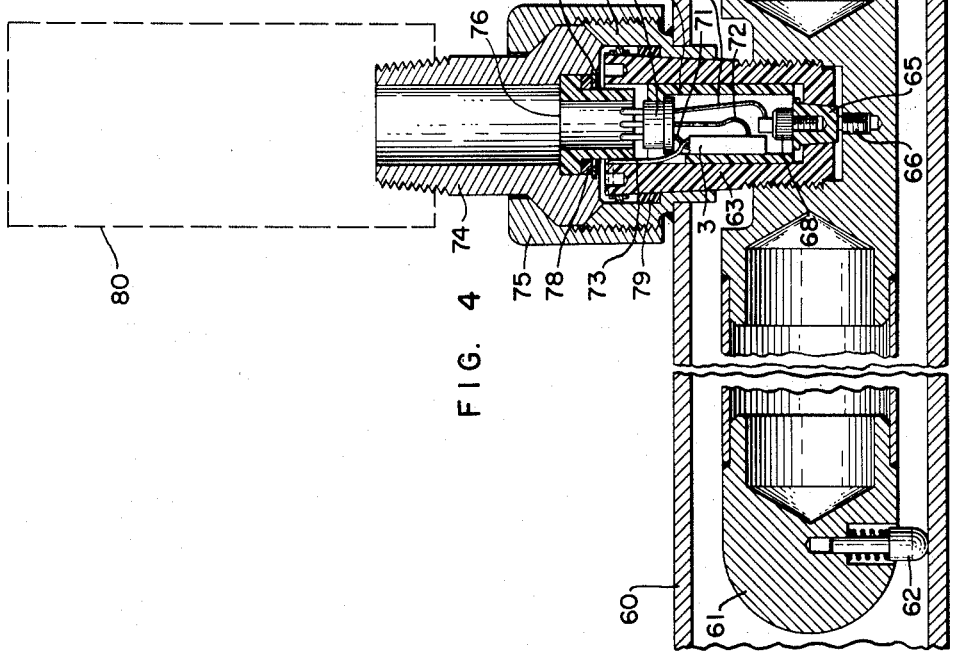

United States Patent Office 3,020,476
Patented Feb. 6, 1962

3,020,476
MEASURING APPARATUS
George V. Jacoby, Philadelphia, Pa., assignor to Minneapolis-Honeywell Regulator Company, Minneapolis, Minn., a corporation of Delaware
Filed May 26, 1958, Ser. No. 737,761
5 Claims. (Cl. 324—61)

This invention relates to electrical apparatus. More specifically, the present invention relates to a signal voltage measuring device.

An object of the present invention is to provide an improved measuring device for determining the value of a physical variable.

A specific object of the present invention is to provide an improved measuring device as set forth wherein the physical variables may be represented as an electrical voltage signal.

A more specific object of the present invention is to provide an improved measuring device of the type set forth wherein the measurement is a function of voltage signal differences.

A still more specific object of the present invention is to provide an improved measuring device as set forth wherein the voltage signals are capacitatively developed.

Capacitance type measuring devices are frequently used for monitoring industrial process through the use of a test capacitor. Since the capacity of a capacitor is partly determined by the dielectric material between the plates thereof, the material of the process under study may be used as the dielectric of the test capacitor. Heretofore, the measurement of a variation in capacity of the test capacitor, resulting from a change in the dielectric material, has usually been performed by one of two devices. One such device for capacity measurements comprises a capacitance bridge circuit supplied by a radio frequency generator. The test capacitor is included in one leg of the bridge with an adjustable known capacitor in another leg of the bridge. The adjustment of the known capacitor to maintain bridge balance is an indication of the variations in the dielectric of the test capacitor. Another such device for capacity measurement comprises a radio frequency generator the frequency output of which is dependent on the test capacitor. The frequency variations of the radio frequency generator resulting from changes in the dielectric of the test capacitor are detected by a frequency sensitive device.

The two devices mentioned above have several disadvantages. The first device requires a very stable generator and a variable precision capacitor. The second device requires a generator responsive only to variations in the test capacitor and a very sensitive frequency detector. Neither of the aforementioned devices, consequently, is completely satisfactory with regard to expense and long-time stability. In addition, no completely satisfactory solution is found in either of the two devices as to the problems of transient dielectric temperature variations and power supply voltage fluctuations.

It is, accordingly, another object of the present invention to provide an improved apparatus for overcoming the aforementioned disadvantages of such prior art measuring devices.

Still another object of the present invention is to provide an improved capacity-type voltage measuring device which is independent of frequency, temperature and power supply fluctuations and which features stability of measuring accuracy.

A still further object of the present invention is to provide an improved test capacitor for a capacity type measuring device, which test capacitor is characterized by simplicity of construction and particular suitability for fluid dielectric measurements.

Still another further object of the present invention is to provide an improved capacity-type measuring device which is characterized by simplified operation and construction.

In accomplishing these and other objects, there has been provided, in accordance with the present invention, a voltage difference measuring device utilizing a capacitor voltage divider and a voltage difference detecting system. The voltage for the voltage divider circuit is supplied from an alternating signal generator. The voltage divider comprises a fixed known capacitor and a test capacitor arranged in series. The alternating voltage signals from the voltage divider are converted into unidirectional voltage signals. The unidirectional voltage signals are, subsequently, detected by a self-balancing potentiometric device.

A better understanding of the present invention may be had from the following detailed description when read in connection with the following drawings in which, FIG. 1 is a schematic diagram of a measuring device embodying the present invention.

FIG. 3 is a schematic diagram of a measuring device embodying the present invention and including a limit indicating system.

FIG. 4 is a cross-sectional view of a structure suitable for use as the test capacitor of the measuring device shown in FIG. 1.

FIG. 5 is an end view of the test capacitor shown in FIG. 4.

Figure 1:
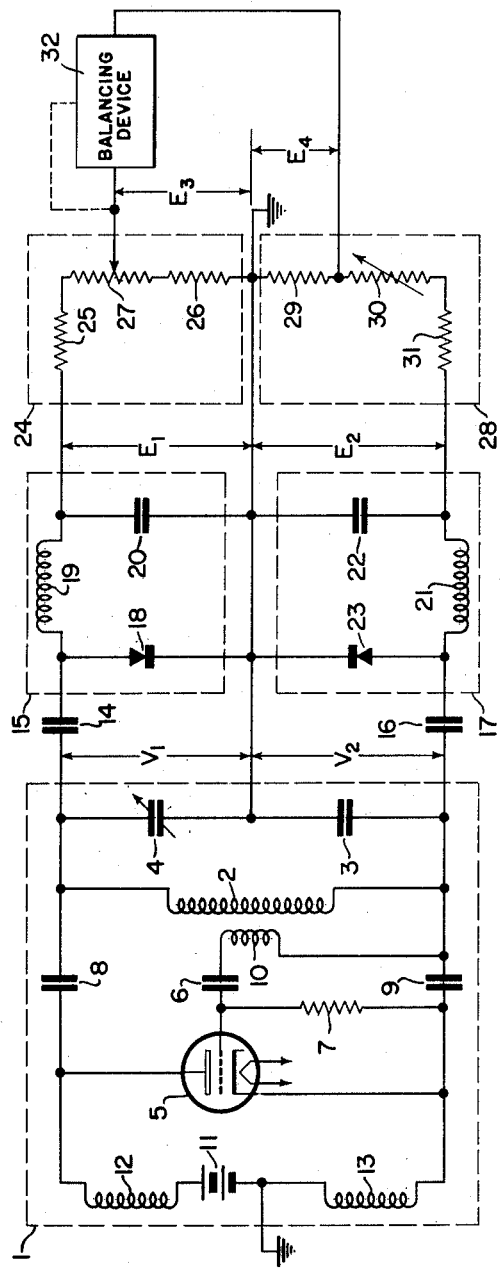

Referring to FIG. 1 in more detail, there is shown a tuned plate oscillator 1. The tank circuit of the oscillator 1 comprises a tank inductance 2, a reference capacitor 3 and a test capacitor 4. The test capacitor 4 is so positioned with respect to the material under test that this material passes between the electrodes thereof and constitutes the dielectric of the test capacitor 4. The reference capacitor 3 is placed in thermal contact with the dielectric material for the purpose of compensating for any adverse effects of temperature variations. Consequently, the reference capacitor 3 is chosen to have an equal temperature coefficient with respect to the temperature coefficient of the test material. The values of the components in the tank circuits, in one preferred embodiment, are selected, in combination with the expected range of values of the test capacitor 4, to produce an oscillation frequency range of 3 to 30 megacycles. The selection of the frequency range is dependent on the resistivity of the test material. Specifically, the frequency range is selected to produce a small component of resistive current through the test material in comparison to a high component of capacitive current. As a result of the above mentioned current ratio, the measuring accuracy of the present invention is substantially independent of resistivity changes in the test material resulting from transient environmental conditions. An example of a use for the measuring device of the present invention for which the specified frequency range is suitable is seen in the determination of water contamination in oil; i.e., a so-called water-cut meter. A water-cut meter employing the present invention is capable of detecting minute traces of water in an oil dielectric. The same frequency range may be used with the present invention in the measurement, during the manufacturing process, of the air content in ice-cream. The continuous measurement of the air-content in the ice-cream may be used to effect the production of a highly uniform product.

The oscillator 1 also includes an oscillator tube 5, a grid capacitor 6, a grid resistor 7, two blocking capacitors 8, 9 and a coupling coil 10. A power supply 11 for the oscillator 1 is isolated from the alternating signals thereof by a pair of chokes 12, 13.

The voltage appearing across the tank circuit during the operation of the oscillator 1 is divided between the two tank capacitors 3, 4 in proportion to their relative capacity. The voltage across the tank circuit is used as a common supply for the test capacitor 4 and the reference capacitor 3, thereby rendering the measuring circuit of the present invention relatively independent of any changes in voltage or frequency appearing across the tank circuit.

The fluctuations of the portion of the voltage division appearing across the test capacitor 4 is coupled by a first coupling capacitor 14 to a first rectifying circuit 15. In a similar manner, the portion of the voltage division appearing across the reference capacitor 3 is coupled by a second coupling capacitor 16 to a second rectifying circuit 17. The two rectifying circuits 15, 17 are substantially identical and rectify the signals from their respective capacitors in a manner well-known in the art. The first rectifying circuit 15 comprises an asymmetrically conductive device 18, a filter choke 19 and a filter capacitor 20. The second rectifying circuit 17 comprises a filter choke 21, a filter capacitor 22 and an asymmetrically conductive device 23. The two asymmetrically conductive devices 18, 23 are similar devices and may be a pair of matched tube-type diodes or crystal diodes. The two rectifying circuits 15, 17 are connected to a common ground connection. The output voltage signals from each of the rectifiers 15, 17 are consequently measured with respect to ground. The outer voltage signal from the first rectifier 15 is applied across a first group of serially connected resistors 24. The first resistor group 24 comprises a pair of resistors 25, 26 and a potentiometer type resistor having a variable slider 27. The output voltage signal from the second rectifier 17 is applied across a second group of serially connected resistors 28. The second group of resistors 28 comprises three resistors 29, 30, 31. The first group of resistors 24 and the second group of resistors 28 are connected to a common ground terminal.

A balancing device 32 is provided for sensing the difference between the voltage at the slider of the potentiometer resistor 27 and the voltage at a pre-selected point in the second group of resistors 28. The balancing device 32 may be mechanically coupled to the slider on the potentiometer 27 to adjust the difference voltage to a value of zero. The balancing device 32 may also be arranged to simultaneously record the adjustments performed on the slider of the potentiometer 27 to maintain a zero value of the difference voltage. A suitable device for performing the balancing and recording function of the balancing device 32 is shown in the Wills Patent No. 2,423,543. The slidewire shown therein is substantially represented by the potentiometer 27 of the present invention.

The complete mode of operation of the apparatus of the present invention follows:

Initially, the apparatus of the present invention is prepared for the measuring operation by a calibration adjustment. In order to obtain a reading of a deviation in the dielectric material, a reference point for the measuring process is selected. Assuming the apparatus of the present invention is to be used to measure water contamination of oil flowing in a pipeline, the calibration adjustment is performed with a known sample of oil dielectric. The total voltage appearing across the tank circuit divides between the test capacitor 4, containing the oil dielectric, and the reference capacitor 3 as explained above. The voltages appearing across the test capacitor 4 and the reference capacitor 3 are rectified into representative unidirectional voltages. The representative unidirectional voltage for the test capacitor 4 is applied across the first group of resistors 24. The representative unidirectional voltage for the reference capacitor 3 is applied across the second group of resistors 28.

As a means for performing the calibration adjustment, the center resistor 30 of the second group of resistors 28 is a variable resistor. One terminal of the input of the balancing device 32 is connected to a point, in the second group of resistors 28, between the first resistor 29 and the variable resistor 30. The other terminal of the input of the balancing device 32 is connected to the slider of the aforementioned potentiometer 27. Both representative unidirectional voltages are measured with respect to a common terminal and are arranged to have similar polarities with respect to the common terminal. The input voltage to the balancing device 32, therefore, is the difference between the two unidirectional voltages.

Assuming the variable resistor 30 is pre-selected to have an adequate range of adjustment, the variable resistor 30 is adjusted until the difference voltage appearing at the input of the balancing device 32 is a zero value. The resulting indication of the balancing device 32 with the selected input difference-voltage, on the cooperating recording means, represents the reference or known water contamination. When the apparatus has been thus calibrated, the known oil sample is removed from the test capacitor 4 and replaced by the oil to be measured for water contamination.

A deviation of the water contamination in the oil flow under study from the calibration sample varies the relative voltage appearing on the test capacitor 4 with respect to that on the reference capacitor 3. As a result of the above variation, the opposing unidirectional voltages at the input to the balancing device 32 are unequal. The resulting difference voltage signal actuates the balancing device 32 to produce a mechanical adjustment of the slider on the potentiometer 27. The slider adjustment is performed until the difference voltage signal at the input of the balancing device 32 is zero. As mentioned previously, the potentiometer adjusting or balancing device 32 may be of a type as shown in the aforesaid Wills patent. The balancing device 32 as disclosed in the Wills patent is capable of providing a record of the adjustment action thereof. In this case, the recording function performed by the balancing device 32 records the adjustment of the slider of the potentiometer 27. The adjustments of the slider of the potentiometer 27 and the record thereof are representative of the variations in the water contamination of the oil under test.

The following is a mathematical explanation of the relationships involved in the apparatus according to the present invention.

Let $C_L$ = the capacity of the test capacitor 4
$C_0$ = the capacity of the reference capacitor 3
$C_{L0}$ = the initial capacity of the test capacitor 4
$V$ = the total voltage across the tank circuit
$V_1$ = the voltage across $C_L$
$V_2$ = the voltage across $C_0$
$R_1$ = resistance of the resistor 25
$R_3$ = resistance of the resistor 26
$R_w$ = resistance of the potentiometer 27
$R_4$ = resistance of the resistor 29
$R_p$ = resistance of the variable resistor 30
$R_2$ = resistance of the resistor 31
$E_1$ = the voltage across resistor group 24
$E_2$ = the voltage across resistor group 28
$E_3$ = the voltage at the tap of the potentiometer 27, and
$E_4$ = the voltage at the fixed tap of the second resistor group 28.

The voltage division in the tank circuit is:

$$V_1 = \frac{C_0}{C_L + C_0} V \qquad (1)$$

$$V_2 = \frac{C_L}{C_L + C_0} V \quad (2)$$

$$C_L = C_{L0} + \Delta C_L = C_{L0}\left(1 + \frac{\Delta C_L}{C_{L0}}\right) = K C_{L0} \quad (3)$$

where $$K = 1 + \frac{\Delta C_L}{C_{L0}} \quad (4)$$

and $$J = \frac{C_{L0}}{C_0} \quad (5)$$

At the time of balance $E_3 = E_4$ therefore, $$E_3 = \frac{E_1}{R_1 + R_w + R_3}[R_3 + \alpha R_w] = E_4 = \frac{E_2}{R_2 + R_p + R_4} R_4 \quad (6)$$

where $\alpha$ = percent of total resistance of potentiometer 27 between tap and reference starting point, then $$\alpha = \frac{E_2}{E_1} \cdot \frac{R_4}{R_w} \cdot \frac{R_1 + R_w + R_3}{R_2 + R_p + R_4} - \frac{R_3}{R_w} \quad (7)$$

$$\alpha = KJ \cdot \frac{N_2}{N_1} \cdot \frac{R_1 + R_w + R_3}{R_2 + R_p + R_4} - \frac{R_3}{R_w} \quad (8)$$

where $N_1$ = rectification efficiency of the first rectifier 15
$N_2$ = rectification efficiency of the second rectifier 17, and
$E_1 = N_1 V_1 \quad E_2 = N_2 V_2$
if $R_3 = R_4$ and $$\frac{R_3}{R_w} = \frac{R_4}{R_w} = B \quad (9)$$

where B is a proportionality constant, then $$\alpha = B\left(KJ \frac{N_2}{N_1} \cdot \frac{R_1 + R_w + R_3}{R_2 + R_p + R_4} - 1\right) \quad (10)$$

An additional assumption is:

$$J \frac{N_1}{N_2} \cdot \frac{R_1 + R_w + R_3}{R_2 + R_p + R_4} = 1 \quad (11)$$

Equation 11 is the result of having equal currents through the two resistor groups 24, 28.

$I_1$ = the D.C. current through the first resistor group 24
$I_2$ = the D.C. current through the second resistor group 28

$$I_1 = N_1 \frac{V_1}{R_1 + R_w + R_3} \quad (12)$$

$$I_2 = N_2 \frac{V_2}{R_2 + R_p + R_4} \quad (13)$$

$$\frac{I_2}{I_1} = J \frac{N_2}{N_1} \cdot \frac{R_1 + R_w + R_3}{R_2 + R_p + R_4} \text{ if } C_L = C_{L0} \quad (14)$$

therefore, when $I_1 = I_2$, $$J \frac{N_2}{N_1} \cdot \frac{R_1 + R_w + R_3}{R_2 + R_p + R_4} = 1 \quad (15)$$

The calibration process, described hereinbefore, is, in effect, an adjustment of the aforementioned two currents, $I_1$ and $I_2$. The resistance of the resistor 26 is assumed equal to the resistance of the resistor 29, and the resistances of the remaining two resistors 25, 31 are made equal to each other to simplify the circuitry and the calculations. The effect of adjusting the resistance of the variable resistor 30 during the calibration process, consequently, is to make the currents, $I_1$ and $I_2$, equal to each other. The position of the slider on the potentiometer 27, as shown by the foregoing mathematical presentation, represents a position of zero voltage-difference signal obtained through the means of equalizing the two currents, $I_1$ and $I_2$.

The change in the dielectric of the test capacitor 4 causes a corresponding change in the relative magnitude of the signals appearing across the resistor groups 24, 28 with respect to each other, resulting in a corresponding inequality of the currents, $I_1$ and $I_2$. The variation in the magnitude of the resistor groups signals, in turn, produces a corresponding change in the difference-voltage signal appearing at the input of the balancing device 32. Since the balancing device 32 is responsive to a difference-voltage signal applied thereto, this device will be operative to adjust the slider of the potentiometer 27 to re-establish a zero value for the voltage-difference signal appearing at the input thereof without affecting the relative magnitudes of the currents $I_1$ and $I_2$. However, the balanced or zero value condition, to the balancing device 32, a situation equivalent to an equality of the two currents, $I_1$ and $I_2$ as obtained during the calibration process.

Therefore:

$$\alpha = B(K - 1) = B \frac{\Delta C_L}{C_{L0}} \quad (16)$$

From Equation 16, it may be seen that the adjustment of the potentiometer 27 is proportional to the percentage change in the capacity of the test capacitor 4. The proportionality constant, designated as B, may be any desired value through the selection of the proper values for the circuit components used in Equation 9.

Figure 2:
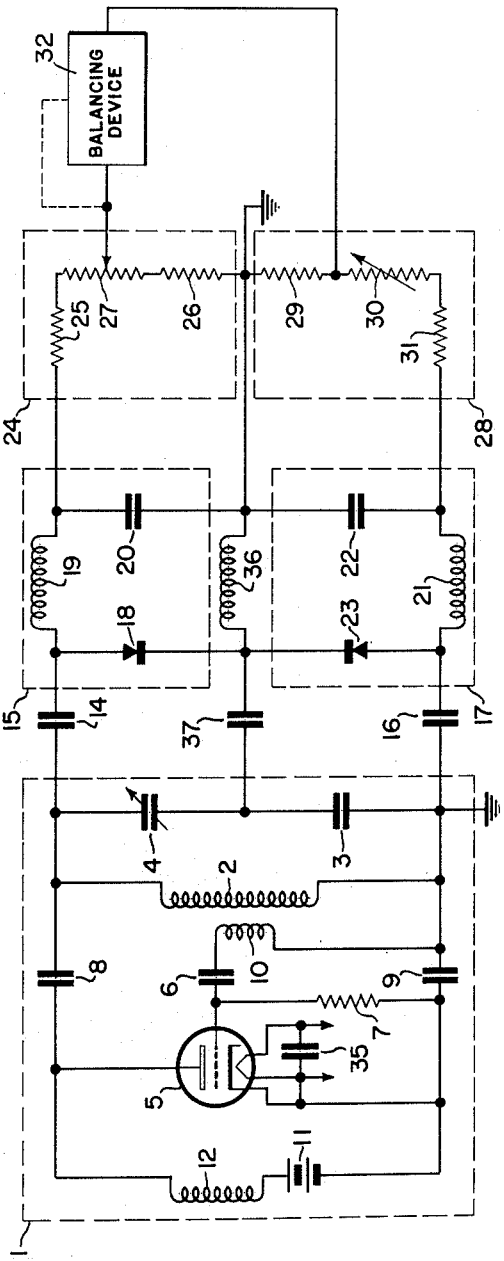
FIG. 2 is a schematic diagram of a somewhat different structure for a measuring device also embodying the present invention.

In FIG. 2 there is shown a somewhat different and preferred structure embodying the present invention. This structure corresponds substantially to the structure shown in FIG. 1 but differs in the manner of affecting the ground circuit of the apparatus of the present invention. As shown in FIG. 2, the power supply 11 is ungrounded and one end of the tank circuit of the oscillator 1 is connected directly to a ground connection. One of the leads of the filament of the oscillator tube 5 is connected to the cathode thereof. A bypass capacitor 35 is connected across the filament of the oscillator tube 5 to provide an alternating signal path from the other lead of the filament to the aforementioned cathode connection. A choke 36 and a blocking capacitor 37 provide alternating signal isolation and unidirectional signal isolation, respectively, through the measuring circuit, of the tank circuit ground connection from the resistor groups 24, 28 ground connection.

The structure, as shown in FIG. 2 is so arranged that the oscillator tube 5 circuit is connected in parallel with respect to the serial combination of the test capacitor 4 and the reference capacitor 3, thus obviating any possible adverse effects from inter-electrode capacitances of the oscillator tube 5. The measuring circuit shown in FIG. 2 operates during the measuring operation of the test capacitor 4 in a manner substantially the same as described hereinbefore, in relation to the measuring circuit shown in FIG. 1.

Another structure embodying the present invention is shown in FIG. 3. This structure corresponds substantially to the structure shown in FIG. 1 with the difference that a fixed voltage-difference detecting device 50 is substituted for the balancing device 32. Also, a trimmer capacitor 51 is connected in parallel with the reference capacitor 3 and the two resistor groups 24, 28, shown in FIG. 1, are replaced by two fixed resistors 52, 53. As before, the two resistors 52, 53 are connected together with their common connection grounded. The voltage signal from the test capacitor 4 appears across the first resistor 52. The voltage signal from the reference capacitor 3 appears across the second resistor 53. The fixed voltage difference detecting device 50 comprises a triode 54 and a current sensitive relay 55. The grid of the triode 54 is connected to the ungrounded end of the first resistor 52. The cathode of the triode 54 is connected to the ungrounded end at the second resistor 53. Consequently, the grid-to-cathode voltage on the triode 54 is the difference between the voltages across the two fixed resistors 52, 53. The difference signal is arranged to produce a negative grid-to-cathode voltage as a control signal for controlling the current of the triode 54.

This grid-to-cathode voltage is adjusted, during an initial calibration process, by the trimmer capacitor 51. The calibration process is performed with an oil sample used in a manner similar to that previously discussed with relation to the structure shown in FIG. 1. The addition or subtraction of capacity in parallel with the reference capacitor 3 alters the voltage division between the two capacitors 3, 4. Consequently, the trimmer capacitor 51 controls the voltage signal appearing at the fixed voltage difference detecting device 50.

A preferred method of calibration is to adjust the trimmer capacitor 51 until the current in the triode 54 is sufficient to actuate the relay 55. The oil sample is subsequently replaced by the oil to be measured. An increase in the water contamination of the oil flow increases the voltage signal representing the test capacitor 4 and simultaneously decreases the voltage signal representing the reference capacitor 3. The resulting difference signal applied to the triode 54 increases the negative grid-to-cathode voltage. A sufficient increase in the negative direction of the grid-to-cathode voltage ultimately decreases the current of the triode 54 to a value which allows the relay 55 to de-energize.

A suitable device for sensing the operation of the relay 55 may be an alarm circuit 56, as shown in FIG. 3. A pair of alarm lights 57 are arranged in combination with the contacts 58 of the relay 55 and a battery 59 to indicate the condition of the relay 55. It will be appreciated an alarm system be used with either of the aforementioned embodiments of the present invention.

The test capacitor 4 may be a device as shown in FIGS. 4 and 5. FIG. 5 shows an end view of the construction for the test capacitor 4. A sectional representation of the construction for the test capacitor 4 is shown in FIG. 4. The construction for the test capacitor 4, shown in the above mentioned figures, is suitable for use in the measurement of fluid dielectric materials. A section of pipe 60, suitable for inclusion in a pipe line of a fluid transporting system, contains, therein, an axially symmetrical metallic cylinder 61. The cylinder 61 is closed at both ends and defines a uniform cylindrical space between the inner wall of the pipe 60 and the outer wall of the cylinder 61. The cylinder 61 is supported at both ends by three spring-loaded fingers 62. In addition, the cylinder 61 is held against the flow of the test fluid by a hollow center support 63. The center support 63 and the fingers 62 are constructed from an electrically insulating material to enable the pipe 60 and the cylinder 61 to form the plates of the test capacitor 4. The center support 63 passes through an opening in the wall of the pipe 60 and is supported therein by a metallic flange 64. The flange 64 and the center support 63 form a fluid tight seal for the opening in the wall of the pipe 60. The bottom of the center support 63 is provided with a threaded metallic plug 65. The plug 65 is electrically connected to the cylinder 61 at a threaded connection 66. An insulating container 67 for the reference capacitor 3 and the connecting wires for the two capacitors 3, 4 is positioned within the center support 63. It will be appreciated that other circuit elements may be enclosed in this insulating container 67, such as the tank inductance 2. The bottom of the container 67 is provided with a terminal 68 for connecting a wire to the plug 65. The top of the container 67 is closed by a suitable male plug 69 for connecting an external cable to the test capacitor 4 and the reference capacitor 3. One pin of the plug 69 is connected by means of a wire 70 to the terminal 68. A second wire 71 connects another pin of the plug 69 to one lead of the reference capacitor 3. A third wire 72 from the socket 69 and a wire 73 from the other lead of the reference capacitor 3 are connected to the flange 64. The interior of the container 67 may be filled with an electrically insulating material to provide a mechanical support for the wires 70, 71, 72, 73 and the reference capacitor 3 and to augment the subjection of the reference capacitor 3 to the thermal fluctuations of the fluid dielectric. An external conduit 74 is connected to the flange 64 by a union nut 75. An external cable socket 76 is secured to the inside of the conduit 74 by a snap ring 77 and a sealing washer 78. An additional sealing washer 79 is used between the top of the center support 63 and the flange 64. An external enclosure 80 is connected to the conduit 74 and may contain the remainder of the measuring circuit of the present invention. However, a remote location for the aforesaid remainder of the circuit may be employed with a suitable connecting cable to the test capacitor 4 and the reference capacitor 3.

Thus, it may be seen that there has been provided, in accordance with the present invention, a capacitance-type voltage measuring device utilizing a test capacitor for a fluid dielectric, which is characterized by an independence from voltage and frequency fluctuations and the inclusion of temperature compensating means.

What is claimed is:

1. A measuring device comprising an alternating signal voltage generator having a pair of output terminals, a pair of capacitive impedance elements serially connected between said output terminals, the capacitive impedance of one of said impedance elements being variable in accordance with the condition of a variable to be measured, said serially connected impedance elements constituting a signal voltage divider for signals developed at said output terminals, a first rectifier circuit for converting alternating signals developed across one of said impedance elements into corresponding unidirectional signals, said first rectifier circuit including a first rectifier having a first and a second terminal, a second rectifier circuit for converting alternating signals developed across the other one of said impedance elements into corresponding unidirectional signals, said second rectifier circuit including a second rectifier having a first and a second terminal, means connecting said second terminal of said first rectifier to said second terminal of said second rectifier to arrange said first rectifier and said second rectifier in an opposing relationship, and utilization means connected between the first output signal terminal of said first rectifier circuit and of said second rectifier circuit, said utilization means being jointly responsive to said unidirectional signals.

2. A water-cut meter for measuring the degree of water contamination in a flow of oil comprising an alternating signal voltage generator having a pair of output terminals, a first and a second capacitive impedance element, said first and second impedance elements being serially connected between said output terminals, the capacitive impedance of said first capacitive impedance element being variable in accordance with the water-contamination in said oil, said variable capacitive impedance element being arranged to use said oil as a dielectric material, said serially connected capacitive impedance elements constituting a signal divider for signals developed at said output terminals, a first rectifier circuit for converting alternating signals developed across one of said impedance elements into corresponding unidirectional signals, said first rectifier circuit including a first rectifier having a first and a second terminal, a second rectifier circuit for converting alternating signals developed across the other one of said impedance elements into corresponding unidirectional signals, said second rectifier circuit including a second rectifier having a first and a second terminal, means connecting said second terminal of said first rectifier to said second terminal of said second rectifier to arrange said first rectifier and said second rectifier in an opposing relationship, and a means connected between said first output signal terminal of said first rectifier circuit and of said second rectifier circuit, said means being responsive to the difference of said unidirectional signals.

3. A water-cut meter as set forth in claim 2 wherein said utilization means includes an electronic vacuum tube having a control grid, a cathode and an anode, said unidirectional signal from said first rectifier being connected to said grid, said unidirectional signal from said second rectifier being connected to said cathode, said difference of said unidirectional signals thereby controlling a current flow to said anode, and utilization means responsive to said current to said anode.

4. A water-cut meter as set forth in claim 2 wherein said first capacitive impedance element comprises a first electrode in the form of a length of pipe suitable for inclusion in a pipeline for transporting said oil, a second electrode in the form of a closed cylindrical member, means for positioning said second member coaxially and in symmetrically spaced relationship with said first electrode, associated circuit elements to compensate said water-cut meter for variations in temperature of said oil, said circuit elements comprising a temperature-sensitive capacitor and circuit means for connecting said temperature-sensitive capacitor as said second capacitive impedance element, and means within said cylindrcal member for supporting said associated circuit elements in thermal association with but with electrical conduction isolation from said oil.

5. A test capacitor for use in determining characteristics of a dielectric fluid, said capacitor comprising a first electrode in the form of a length of pipe suitable for insertion in a pipeline through which said dielectric fluid is arranged to be transported, a second electrode in the form of a closed cylindrical member, support means for positioning said second member coaxially and in symmetrically spaced relationship with said first electrode, said support means being centrally located on said cylindrical member and extending transversely between said first electrode and said second electrode, associated circuit elements to compensate said test capacitor for variations in temperature of said dielectric fluid, said circuit elements comprising a temperature-sensitive capacitor and means within said support means for supporting said associated circuit elements within said cylindrical member in thermal association with but with electrical conduction isolation from said dielectric fluid.

References Cited in the file of this patent

UNITED STATES PATENTS

| | | |
|---|---|---|
| 2,019,481 | Applegate | Nov. 5, 1935 |
| 2,307,319 | Koehler | Jan. 5, 1943 |
| 2,498,103 | Wojciechowski | Feb. 21, 1950 |
| 2,558,945 | Fritzinger | July 3, 1951 |
| 2,588,882 | Rolfson | Mar. 11, 1952 |
| 2,593,175 | Packard et al. | Apr. 15, 1952 |
| 2,783,420 | Thompson et al. | Feb. 26, 1957 |